TELEPHONE DIALING APPARATUS

Filed Oct. 21, 1966 2 Sheets-Sheet 1

INVENTOR

Charles T. Jacobs

INVENTOR
Charles T. Jacobs 3,529,100
Patented Sept. 15, 1970

3,529,100

TELEPHONE DIALING APPARATUS

Charles T. Jacobs, Bernardsville, N.J., assignor to G-V Controls Inc., Essex County, N.J., a corporation of New Jersey Filed Oct. 21, 1966, Ser. No. 588,366
Int. Cl. C04m 1/45
U.S. Cl. 179—90 11 Claims

ABSTRACT OF THE DISCLOSURE

A combination of a plurality of groups, each of a plurality of capacitors, is used in a repertory dialling apparatus. The capacitors are connected to circuitry which is normally effective to maintain each of the capacitors in a normal state of charge. A switching means is employed between the capacitors and a conductor operating to connect at least one selected capacitor in each group to the conductor to effect the changing of the state of charge on the selected capacitors. A stepping means is actuated to establish with respect to the selected capacitors in a predetermined group-to-group succession, current flows tending to restore their normal states of charge, the current flows being used to control the transmission of dialing signals.

This invention relates to telephone dialing apparatus, and more particularly to such apparatus by which a multi-digit telephone address may be dialed in reponse to the manipulation of a single control—e.g. the depression of a single button. The term "telephone address" is used herein to denote what is commonly referred to as "telephone number." The term "dialing" is used in the broad sense of commanding a connection with the telephone at a particular telephone address, without limitation to the specific sense of manipulating a dial as such.

While not in all aspects limited thereto, the invention is illustrated and described in connection with pulse dialing, wherein each digit is represented by a train of pulses (of number from one to ten) of predetermined periodicity. For the sake of simplicity the illustration and description are presented in terms of apparatus for the dialing of three-digit telephone addresses, but it will of course be understood that no limitation whatever to three digits is intended.

A typical embodiment of the invention in its overall aspect may comprise a pulse generator which while operative generates and transmits a train of pulses of predetermined pulse length and periodicity; principal timing means operatively connected with the pulse generator for determining the length of interval throughout which the pulse generator will be operative; interval-control means operatively connected with the principal timing means and having a plurality of stages each commanding a respective interval of such determination; stepping means operatively connected with the interval-control means for rendering sequentially effective the several stages thereof; and means rendering the pulse generator operative throughout the intervals sequentially determined by the interval-control means.

Supplementary timing means may be included for establishing a short time space between each non-terminal one of the determined intervals and the succeeding one. Means may be included for rendering each of the determined intervals at least substantially an integral multiple of the pulse period of the pulse generator.

In a simple embodiment the several stages of the interval-control means may be preadjustable in accordance with the intervals appropriate to a telephone address to be dialed. In a more elaborate embodiment there may be included a plurality of address conductors and a plurality of means, respectively associated with those address conductors, each for preadjusting the several stages of the interval-control means in accordance with the telephone address of the respective conductor.

When the determination of the number of pulses in a train is effected by timing, then (assuming the need for as many as ten pulses, which is the number of pulses ordinarily used to signal the integer "0") the maximum permissible tolerance for the timing means becomes somethink less than ±10% which, at least under adverse operating conditions such as extreme temperature and the like, is a rather onerous requirement. I have observed that this tolerance may be doubled if the timing means be made up of two timers, of which only one will be used for trains of up to five pulses and both will be used for longer trains up to and including the usual limit of ten. In a specific aspect my invention contemplates this make-up of the timing means.

To provide for variability of the timing interval I have found particularly advantageous the use of an electronic timer whose timing interval is controlled by two parameters one of which is resistance; of a plurality of resistors by which that interval may be variously determined; and of a plurality of transistors by which those resistors may be selectively connected in the timer. In another specific aspect the invention contemplates such an arrangement.

In another aspect, not necessarily limited to pulse dialing, the invention contemplates the use of a plurality of capacitors; a pair of conductors to a first of which a first terminal of each of the capacitors is connected; means for maintaining the second of the conductors at a potential substantially different from that of the first; switching means interposed between the capacitors and the second conductor and operable to effect the charging of selected ones of the capacitors; stepping means actuable to abstract currents from the charged capacitors in a predetermined succession; and means controlled by the abstracted currents for transmitting dialing signals.

The invention has various other aspects, some more limited than those briefly indicated above, and some broader in that they are subcombinational either under one or another of the above aspects or otherwise.

Various objects of the invention have been made apparent by the foregoing brief description. Allied and other objects and aspects will appear from the following detailed description and the appended claims.

In the detailed description of the invention hereinafter set forth reference is had to the accompanying drawings, in which:

FIG. 1 is a schematic diagram of a typical embodiment of the invention, omitting specific details of the pulse generator, timers and stepping means;

FIG. 1*a* is a fractional view illustrating a modification of one portion of the embodiment of FIG. 1;

Figure 1:
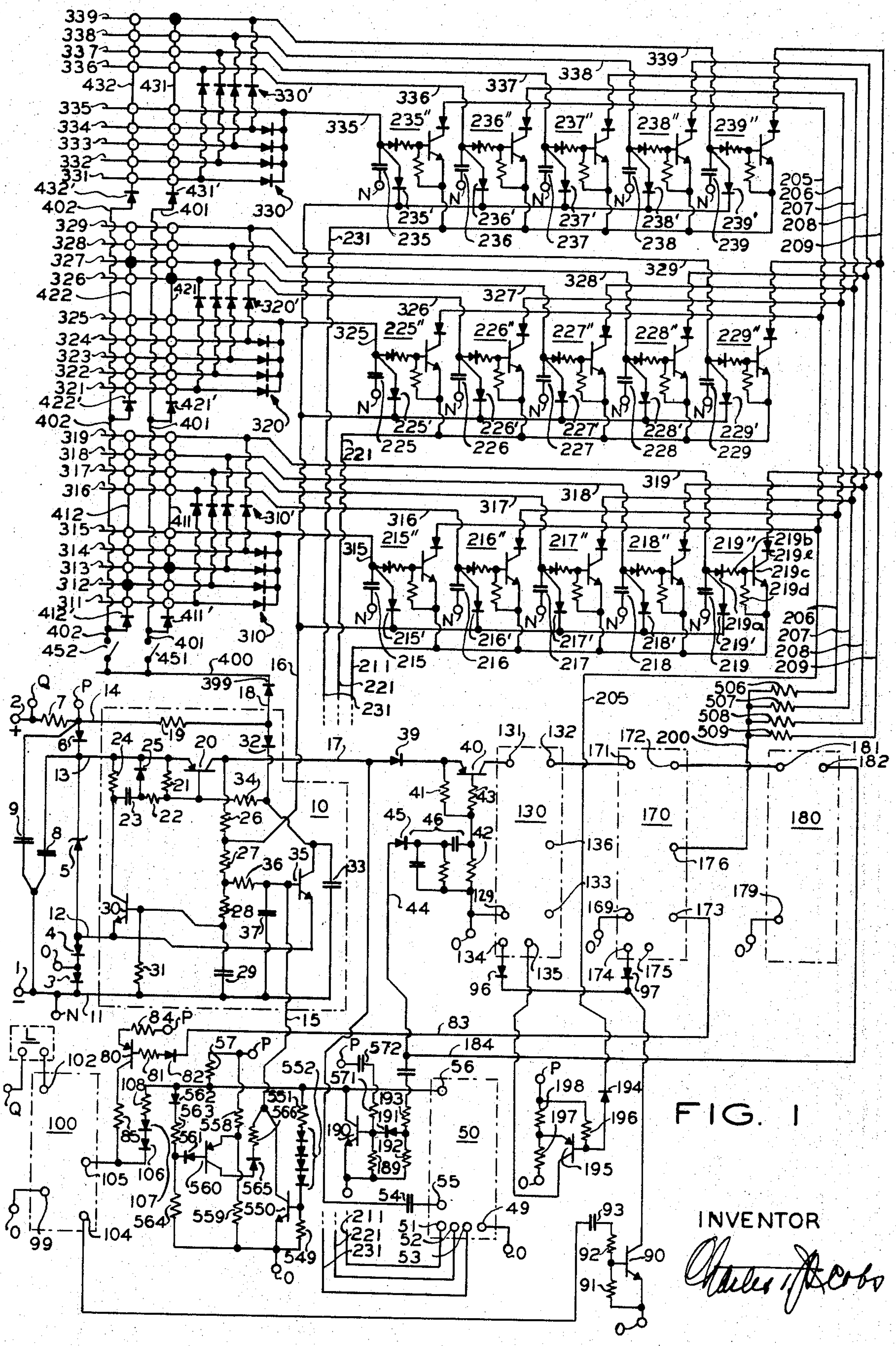

Except as otherwise noted the description is presented with reference to FIG. 1.

In FIG. 1 the pulse generator above referred to is designated as 100, details of a typical form thereof being shown in FIG. 2 and being hereinafter detailedly described. In general, it is provided with a reference terminal (analogous to a "ground" terminal) 99 which may be connected to an external point O of reference potential, and with an output terminal 102 which during each pulse will become effectively connected by the pulse generator to the reference terminal 99 and thus to the point O; an output load L—typically the coil of an electromagnetic relay whose contacts are connected to a telephone line (not shown) to cause the transmission of the pulses over that line—is shown connected between the output terminal 102 and a point Q of potential positive with respect to point O, so that current will flow through the load L during each pulse. The pulse generator may further be provided with a "squelch" terminal 105 which when rendered substantially positive by external means will maintain the pulse generator inoperative, and with a "synch" terminal 104 which by the pulse generator will be rendered substantially positive during each pulse but will otherwise be kept substantially at the potential of the point O.

Figure 3:
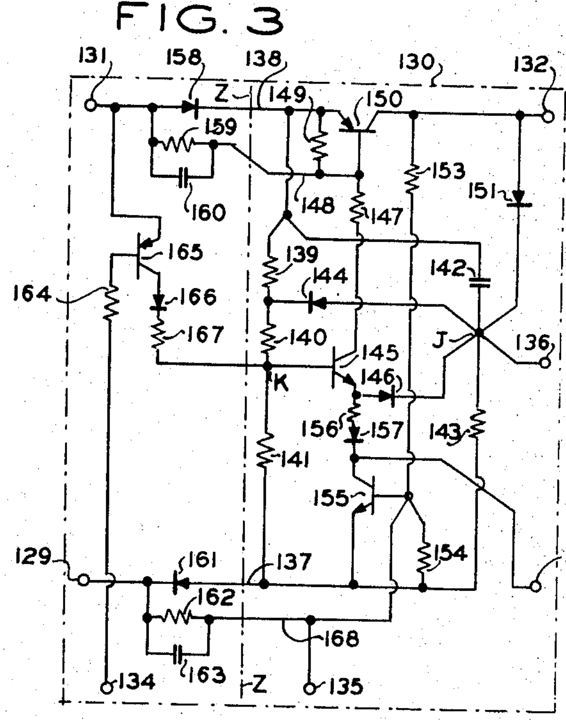
FIG. 3 is a schematic diagram of a basic design of timer according to the invention and suitable for use in the embodiment of FIG. 1.

The principal timing means above referred to may typically consist of two electronic timers of which the first is designated as 130 and the second as 170; a typical basic design to which each of these timers may for example conform is shown in FIG. 3 and is hereinafter detailedly described. In general, and speaking arbitrarily in terms of the first timer 130, the timer may be provided with a reference terminal 129 which may be connected to the point O. (Note is made that many points O appear in FIG. 1, but that they are all electrically identical—their separate showings being to avoid the complication of the figure by unnecessary lines.) The time is further provided with an input terminal 131 whose connection to a point of substantially positive potential will energize the timer and actuate it to operate through a timing duration at the end of which the timer will be triggered; with a main output terminal 132 which upon triggering of timer and for so long thereafter as the timer remains energized will be effectively connected to the input terminal 101; and with a supplementary output terminal 133 which upon triggering of the timer and for so long thereafter as the timer remains energized will be effectively connected by the timer to the point O. The timer may further be provided with a "synch" terminal 134 whose effective momentary connection through external means to a point of low potential, at a time when the timer is within a fraction of one pulse period of triggering, will induce that triggering forthwith, and with an "instant-trigger" terminal 135 whose connection through external means to a point of substantial positive potential will result in immediate triggering of the timer (provided the timer be energized but otherwise without regard to its timing duration). The timer may still further be provided with a "time-variation" terminal 136; by the effective connection of an external resistor between this terminal and the point O the timing duration of the timer may be shortened to a degree increasing with lowering of the value of that resistor.

The first timer may have a normal timing duration somewhat in excess of five pulse periods; its supplementary output treminal 133 and its time-variation terminal 136 need not be used. The second timer 170 (each of whose terminals is designated by a number higher by 40 than the corresponding terminal of the first timer) may have a similar normal timing duration; its instant-trigger terminal 176 need not be used. The second timer is placed in tandem relationship to the first by interconnection of terminals 171 and 132—the principal timing means accordingly having the input terminal 131, the main output terminal 172 and the supplementary output terminal 173.

The interval-control means above referred to is hereinafter detailedly described. In general, it is provided with first-, second- and third-stage conductors 211, 221 and 231 respectively, and its first, second and third stages are sequentially rendered effective by the successive effective connections of those conductors to the point O. Each of its stages when effective commands the behavior of the principal timing means 130—170 through two conductors 200 and 205, which are common to those several stages and which are operatively connected with the principal timing means, in manner hereinafter set forth.

The stepping means above referred to is designated as 50, details of a typical form thereof being shown in FIG. 4 and being hereinafter detailedly described. In general, it is provided with a reference terminal 49 which may be connected to the point O, and with three output terminals 51, 52 and 53—the function of the stepping means when actuated being to accomplish the effective connection of those output terminals successively to the point O. The stepping means may be provided with a "start" terminal 55 to which a momentary positive voltage may be applied to actuate the stepping means, and with a control terminal 56 to which there may be applied a poorly regulated positive voltage. Upon actuation of the stepping means the output terminal 51 will first be effectively connected to the point O. Thereafter a momentary effective connection of the control terminal 56 to the point O will result in the effective disconnection of 51 from, and the effective connection of 52 to, O; thereafter a momentary such connection of 56 will result in the effective disconnection of 52 from, and the effective connection of 53 to, O; and thereafter a momentary such connection of 56 will result in the effective disconnection of 53 from O and the resumption by the stepping means of a quiescent state. Each of the actions described in the preceding sentence as invoked by a momentary effective connection of the control terminal 56 to the point O is hereinafter sometimes referred to as an advancement of the stepping means. The output terminals 51, 52 and 53 are respectively connected with the first-, second- and third-stage conductors 211, 221 and 231 referred to in the preceding paragraph.

Before describing the interrelationships of the elements already dealt with two other elements may be mentioned. One of those elements is a supplementary timing means consisting of a third timer 180, shown as having a reference terminal 179 which may be connected to the point O, an input terminal 181 and an output terminal 182, and for example having a timing period of about two pulse periods; although it performs a less exacting function than the two timers of the principal timing means, the third timer may permissibly be of essentially similar design. The other of those two elements is a control unit 10, shown in detail in FIG. 1 and hereinafter detailedly described, through which power is supplied to other portions of the apparatus. In general, the control unit 10 may be provided with four power-input conductors 11, 12, 13 and 14, with two power-output conductors 17 and 18, with a control conductor 16 through which it performs certain functions on the interval-control means (which is shown in the upper portion of FIG. 1), and with a "clamp-out" conductor 15 which when effectively connected to the point O through external means clamps the control unit in inoperative condition.

The interrelationships of the elements dealt with in the preceding six paragraphs, together with auxiliary elements which are associated therewith, may be described as follows:

A pair of power-input terminals 1 and 2 may respectively serve to connect the apparatus to the positive and negative terminals of a D.C. power source (not shown). From the terminal 2 to the terminal 1 there may be serially connected in succession a voltage-reducing resistor 7, a diode 6, a Zener diode 5, a diode 4 and a diode 3; a capacitor 8 may be connected from the junction of 5 and 6, and a capacitor 9 from the junction of 6 and 7, to the terminal 1. The power-input terminal 1 may be connected to a point N, the junction of diodes 3 and 4 may be connected to the point O above referred to, the junction of diode 6 and resistor 7 may be connected to a point P, and the power-input terminal 2 may be connected to the point Q above referred to. (It will be understood with respect to each of the points N, P and Q that it, although appearing more than once in the figures, represents an identical electrical point, as has already been mentioned with respect to the point O.) It will be recognized that, relative to the point O, the point N has a potential of about −0.7 volt; that the point P has a positive potential, regulated by the Zener diode, of many volts; and that the point Q has a still higher unregulated positive potential. The power-input conductors of the control unit 10 may be connected as follows: 11 to the point N, 12 to the junction between diode 4 and Zener diode 5 (so that it acquires a potential, relative to the point O, of +0.7 volt), 13 to the junction between Zener diode 5 and diode 6 (so that it acquires a potential of 0.7 volt less than that of point P), and 14 to the point P.

The power-output conductor 17—which when the control unit 10 is operative is effectively connected, as will hereinafter appear, to the power-input conductor 13 so as to acquire a substantial positive potential—may be connected through diode 39 to the emitter of a p-n-p transistor 40; the base of that transistor may be connected to the point O through upper and lower serially arranged resistors 43 and 42 respectively (with a high-valued resistor 41 connected between the emitter and the junction between 43 and 42), so that when conductor 17 is brought to a positive potential transistor 40 will be brought into conductivity which will persist so long as the conductor 17 retains its positive potential. That transistor may, however, be rendered momentarily non-conductive, for purposes hereinafter apparent, by the momentary application to the junction between 43 and 42 of a potential substantially more positive than that of its emitter; such an application may be accomplished from a conductor 44, when that conductor is momentarily driven to a substantially positive potential, through a network 46 (comprising shunt capacitance and resistance and series capacitance) whose output is connected across the lower resistor 42 and through a diode 45 interposed between the conductor 44 and the input of the network. The collector of the transistor 40 may be connected to the input terminal 101 of the principal timing means 130–170; thus when the conductor 17 is brought to a positive potential the principal timing means will be energized and actuated.

The power-output conductor 17 is also connected through a capacitor 54 to the start terminal 55 of the stepping means 50. Thus also when the conductor 17 is brought to a positive potential (as will hereinafter appear, from a quiescent potential the same as that of the point N) the stepping means 50 will be actuated and thereby rendered operative first to effectively connect the first output terminal 51 to the point O.

The control terminal 56 of the stepping means 50 may be connected to the point P through a resistor 57, it being that resistor which results in the poor regulation referred to above. It may also be connected through a resistor 108 and two diodes 107 and 106, all in series with each other, to the squelch terminal 105 of the pulse generator 100, it being the positive potential quiescently applied to the squelch terminal through this connection which maintains the pulse generator quiescently in a squelched or inoperative condition. As will hereinafter appear, a rendering operative of the stepping means 50 results in a substantial current demand by the control terminal 56, and the flow of the attendant current through the resistor 57 will lower the potential of the terminal 56 to a low value—in turn removing any appreciable positive potential from the squelch terminal 105. Accordingly when the conductor 17 is brought to a positive potential a further event is the rendering operative of the pulse generator 100, from which while it remains operative pulses of the predetermined pulse length and periodicity will be transmitted to the load L.

Between the synch terminal 104 of the pulse generator and the point O there may be connected a series circuit comprising a capacitor 93, an upper resistor 92 and a lower resistor 91, and the base of an n-p-n transistor whose emitter is connected to the point O may be connected to the junction between resistors 92 and 91. The synch terminal 134 of the first timer 130 may be connected through a diode 96 to the collector of the transistor 90, and the synch terminal 174 of the second timer 170 may be connected through a diode 97 to the same collector. The synch terminal 104 was mentioned above to be rendered positive during each pulse; acordingly through 93 and 92 the transistor 90 will be momentarily rendered conductive at the beginning of each pulse. Thus at the beginning of each pulse the transistor 90 and the diodes 96 and 97 will momentarily effectively connect the synch terminals 134 and 174 to the point O; this momentary connection will be without effect on either timer except under the circumstance that that timer be energized and that it be about to trigger (i.e. be within a fraction of one pulse period of such triggering)—but under that circumstance that momentary connection will induce the triggering of that timer forthwith.

As above described—the power-output conductor 17 having been brought to a positive potential—the principal timing means 130–170 (considered as a unit) will stand actuated, the stepping means 50 will stand actuated and will be effectively connecting its output terminal 51 to the point O, and he pulse generator 100 will have been placed in operation.

The first timer 130 will proceed through the first five pulse periods of that timer's timing duration of five-and-a-fraction pulse periods, and in the earlier portion of each of those pulse periods a pulse will be transmitted by the pulse generator. At the end of five pulse periods (i.e. at the very beginning of a sixth), however, the first timer 130 will be about to trigger (i.e. will be within a fraction of one pulse period of triggering), and by reason of the action described in the second preceding paragraph it will then trigger forthwith—the effect of that triggering being to energize and actuate the second timer 170. While the stepper continues uninterruptedly to stand actuated and the pulse generator continues to operate, the second timer 170 will proceed into its timing duration (also basically of five-and-a-fraction pulse periods) and will proceed through the first five pulse periods thereof—at the end of which it will be triggered forthwith by reason of the action described in the second preceding paragraph.

The triggering of the second timer 170 accomplishes two functions, of which a first is the resquelching of the pulse generator 100 to place it out of operation. For this purpose there may be provided a p-n-p transistor 80 whose emitter is connected through a resistor 84 to the point P and whose collector is connected to the squelch terminal 105 of the pulse generator through a resistor 85; the base of the transistor 80 may be connected through a resistor 81, a diode 82 and a conductor 83 to the supplementary output terminal 173 of the second timer 170. Except when that timer is both energized and triggered its supplementary output terminal 173 cannot draw current from the conductor 83, and the transistor 80 will therefore be non-conductive; when that timer is energized and triggered, however, the supplementary output terminal 173 is effectively connected to the point O, current will accordingly be drawn through the conductor 83 and the transistor 80 will thus be rendered conductive, resulting in the application of a positive voltage to the squelch terminal 105 and in the squelching of the pulse generator. By its resquelching of the pulse generator the principal timing means 130–170 has accomplished a determination of the length of interval throughout which the pulse generator has been operated—e.g. in the case thus far dealt with, a determination of the length of that interval as ten pulse periods, so that the pulse generator will have transmitted ten pulses.

The second function accomplished by the triggering of the second timer 170 (and thus of the principal timing means as an entirety) is the energization and actuation of the third timer 180 (i.e. of the supplementary timing means). This may be arranged for by interconnection of the input terminal 181 of the third timer with the main output terminal 172 of the second timer.

While the stepping means continues uninterruptedly to stand actuated, but with the pulse generator now inoperative, the third timer 180 will proceed through its timing duration, typically of about two pulse periods, at the end of which it will be triggered to result in the application of a positive potential to a conductor 184 which may be connected to its main output terminal 182. This in turn accomplishes two functions, one of them being the de-energization of both the principal and supplementary timing means 130–170 and 180. This de-energization is accomplished by rendering momentarily non-conductive the transistor 40, which as abovementioned may in turn be accomplished by the application of a momentary positive potential to the junction of resistors 43 and 42 through conductor 44, diode 45 and network 46; for this purpose the conductor 44 may be connected to the conductor 184. (Note is made that if the third timer 180 be of a basic type similar to that of the timers 130 and 170, the rendering positive of the conductor 184 which occurs upon triggering of the third timer is not inherently limited to a momentary one—but the de-energization of the third timer which has just been seen to occur as a result of rendering the conductor 184 positive results in its being so limited. No limitation in respect of the type of the third timer is in this regard intended.) The underlying significance of the de-energization is the removal of all three timers from triggered condition so that the first timer—and thus the principal timing means considered as an entirety—will be enabled to start the determination of a new interval of pulse-generator operation.

The other function accomplished by the application of positive potential to the conductor 184 occurring upon triggering of the third timer (for which function a momentary such application is sufficient) is the advancement of the stepping means 50. For this purpose a series circuit successively comprising a capacitor 194, an upper resistor 193 and a lower resistor 192 may be connected from the conductor 184 to the point O; there may further be provided an n-p-n transistor 190 whose collector is connected to the terminal 56, whose emitter is connected to the point O and whose base-emitter path may be shunted by a high-valued resistor 189—the junction between resistors 193 and 192 being connected to the base of the transistor 190 through a diode 191. Normally the transistor 190 will of course be non-conductive; the application of a positive potential to the conductor 184, however, will momentarily drive the base of transistor 190 positive (through 194, 193 and 191), and the transistor will then momentarily effectively connect the control terminal 56 to the point O to result in the advancement of the stepping means 50.

The de-energization of the principal timing means (which was among the first mentioned of the functions occurring upon the triggering of the third timer 180) will of course have terminated the effective connection of the conductor 83 to the point O and thus the squelching of the pulse generator by the transistor 80. There will accordingly have been re-established the conditions of the timing means, the stepping means and the pulse generator which obtained at the beginning of the actions described in the preceding five paragraphs—excepting that as a result of its advancement the stepping means will now be effectively connecting its output terminal 52, rather than 51, to the point O.

The actions just referred to will now occur for the second time, and upon their conclusion there will have again been re-established the conditions just mentioned—excepting that as a result of its further advancement the stepping means will then be effectively connecting its output terminal 53, rather than 52, to the point O. The same actions will then occur for the third time, but upon their conclusion on that occasion the advancement of the stepping means which will occur will be an advancement to its quiescent state; this, terminating the current demand by the control terminal 56, will result in the resumption by that terminal of a substantial positive potential which (in the absence of a reactuation of the stepping means through capacitor 54) will maintain the pulse generator squelched and thus out of operation. (Also upon that conclusion, in the absence of a removal of positive potential from the power-output conductor 17, the principal timing means 130–170 would start the determination of another interval—to no purpose, in view of the inoperativeness of the pulse generator—but this action may be forestalled by then removing positive potential from 17 by means hereinafter described.)

There will now be understood the basic manner in which the apparatus may be operated to achieve the transmission by the pulse generator of three trains of pulses each separated from its predecessor by a short time space (the typically two-pulse-period timing duration of the third timer). As so far described each of those trains would be of ten pulses; it is the interval-control means next to be described which causes the pulses in each train to be of a desired number (which will only on occasion be ten). Certain other matters, such as the control of the potential of the power-output conductor 17, also remain to be and are dealt with hereinafter.

The interval-control means, which is operatively connected with the principal timing means 130–170 through the conductors 205 and 206 through 209, functions to command the interval which will be determined by that timing means. It does so by (i) effecting a reduction of the timing duration of the second timer by one, two, three or four pulse periods, when and as required by the number of pulses in a desired train, which reduction taken alone provides for nine, eight, seven or six pulses in the train, and (ii) foreclosing, when required, the operation of the first timer whereby to reduce what would otherwise be ten pulses to five, what would otherwise be nine pulses to four, etc. It may be made up of a plurality of stages, one for each digit to be dialed by the apparatus (and thus, in the illustrated embodiment, of three stages), which by the stepping means 50 are rendered effective in succession. Each stage may comprise five chargeable capacitors—four for the performance of the function identified above in this paragraph as (i) and one for the performance of the function identified as (ii). Each capacitor may have associated therewith a respective clamping diode for controlling its charge in manner hereinafter explained, and a respective network for abstracting current from the charged capacitor, the network including means controlled by the abstracted current for performing its assigned function on the pincipal timing means.

The capacitors of the first stage appear as 215, 216, 217, 218 and 219, those of the second stage as 225, 226, 227, 228 and 229, and those of the third stage as 235, 336, 237, 238 and 239. The lower plate of each may be connected to a low-potential point, for example the point N abovementioned. The upper plates of the capacitors of the first stage may be connected to conductors 315, 316, 317, 318 and 319 respectively, the upper plates of those of the second stage to conductors 325, 326, 327, 328 and 329 respectively, and the upper plates of those of the third stage to conductors 335, 336, 337, 338 and 339 respectively; those conductors provide for the selective charging of the capacitors in manner hereinafter described. The upper plates of the capacitors of the first stage may also be connected to the anodes of clamping diodes 215', 216', 217', 218' and 219' respectively, those of the capacitors of the second stage to the anodes of clamping diodes 225', 226', 227', 228' and 229' respectively, and those of the capacitors of the third stage to the anodes of clamping diodes 235', 236', 237', 238' and 239' respectively; the cathodes of all those clamping diodes may be connected in common to the conductor 16. The upper plates of the capacitors of the first stage may still further be connected to the inputs of the networks 215'', 216'', 217'', 218'' and 219'', those of the capacitors of the second stage to the inputs of the networks 225'', 226'', 227'', 228'' and 229'', and those of the capacitors of the third stage to the inputs of the networks 235'', 236'', 237'', 238'' and 239'', in each instance respectively.

The fifteen networks thus referred to are all similar, and it is accordingly necessary to describe only one of them—e.g. the network 219''. The input of the network is the anode of an input diode 219*a* whose cathode may be connected through a resistor 219*b* to the base of an n-p-n transistor 219*c* between whose base and emitter there may be connected a high-valued resistor 219*d*; the work terminal of the network is the anode of a protective diode 219*e* whose cathode is connected to the collector of transistor 219*c*.

The emitter of the transistor 219*c*, together with the emitters of the corresponding transistors in the other four neworks of the first stage, is connected to the conductor 211; the emitters of the corresponding transistors in the five networks of the second stage are connected to the conductor 221; and the emitters of the corresponding transistors in the five networks of the third stage are connected to the conductor 231. The work terminals of the networks 219'', 229'' and 239'' are connected to a conductor 209; those of the networks 218'', 228'' and 239'' are connected to a conductor 208; those of the networks 217'', 227'' and 237'' are connected to a conductor 207; and those of the networks 216'', 226'' and 236'' are connected to a conductor 206. Those conductors 209, 208, 207 and 206 are in turn respectively connected to the conductor 200 abovementioned through respective resistors 509, 508, 507 and 506. The work terminals of the networks 215'', 225'' and 235'' are connected to the conductor 205 abovementioned.

The function of each network, when called into play by a rendering conductive of its transistor in manner hereiafter described, is to effectively connect its work terminal to the point O.

The conductor 200 is connected to the time-variation terminal 176 of the second timer 170, so that when the transistor of any of the networks (other than 215'', 225'' and 235'') is conductive a particular one of the resistors 509, 508, 507 and 506 will be effectively connected from that time-variation terminal 176 to the point O. As mentioned above, such a connection will shorten the timing duration of the second timer (and thus the interval determined by the principal timing means 130–170) to a degree which is greater the lower be the value of the resistor thus connected. The resistor 509 is of value appropriate to the shortening of the timing duration of the second timer by one pulse period; the resistor 508, to a shortening by two pulse periods; the resistor 507, to a shortening by three pulse periods; and the resistor 506, to a shortening by four pulse periods.

The conductor 205 is connected through a diode 194 to the base of a p–n–p transistor 195 whose emitter is connected to the junction of the upper and lower resistors 198 and 197 of a series circuit shunted from the point P to the point O, and whose base may be connected to the point P through a high-valued resistor 196; the collector of the transistor 195 is connected to the instant-trigger terminal 135 of the first timer 130. When the transistor in any of the networks 215'', 225'' and 235'' is rendered conductive it will cause the flow of emitter-base current through the transistor 195, thereby rendering that transistor conductive and resulting in the application through that transistor of a positive potential to the instant-trigger terminal 135—which as abovementioned will cause the immediate triggering of the first timer 130.

The manner in which selected ones of the network transistors are rendered conductive is (i) a charging of the capacitors immediately associated therewith, followed by (ii) discharge of those capacitors each through the input path—e.g. input diode 219*a*, resistor 219*b* and the base-emitter path of transistor 219*c*—of the associated network. Such discharge is invoked by the operation of the stepping means 50; while it is effectively connecting its output terminal 51 (and thus the conductor 211) to the point O there will occur the discharge of such capacitor or capacitors of the first stage as have been charged, while it is effectively connecting its output terminal 52 (and thus the conductor 221) to the point O there will occur the discharge of such capacitor or capacitorcs of the second stage as have been charged, and while it is effectively connecting its output terminal 53 (and thus the conductor 231) to the point O there will occur the discharge of such capaitor or capacitors of the third stage as have been charged.

The charging of selected ones of the capacitors may be effected, simultaneously for all three stages, by the effective connection of selected ones of the first-stage conductors 315 through 319, of the second-stage conductors 325 through 329 and of the third-stage conductors 335 through 339 to a conductor 400. For this purpose those conductors, together with four additional first-stage conductors 311 through 314, four additional second-stage conductors 321 through 324 and four additional third-stage conductors 331 through 334, may be extended to form the horizontal bars of a cross-bar arrangement seen in the upper lefthand portion of FIG. 1.

In that cross-bar arrangement there may be provided any number of vertical bars, each for a respective telephone address to be dialed. A first vertical bar may be formed by the vertically aligned conductors 411, 421 and 431, to all three of which a conductor 401 is connected through respective diodes 411', 421' and 431'; a second vertical bar may be formed by the vertically aligned conductors 412, 422 and 432, to all three of which a conductor 402 is connected through respective diodes 412', 422' and 432'; and other corresponding vertical bars (not shown) may be correspondingly provided. In the drawing the intersections of the horizontal and vertical bars are shown as small circles, it being understood that each circle represents a place at which interconnection may when desired be made between the horizontal and vertical conductors which intersect that circle. By a solid-black showing of certain circles in FIG. 1 there are denoted some purely typical such interconnections. Note is made that in the illustrated cross-bar arrangement it is contemplated that no more than one interconnection will be made with respect to any one of the conductors 411, 421, 431, nor with respect to any one of the conductors 412, 422 and 432, nor with respect to any one of the corresponding conductors which may be provided for any other vertical bar.

The four additional first-stage conductors 311, 312, 313 and 314 may be connected through respective diodes, in the diode bank 310', to the first-stage conductors 316, 317, 318 and 319 respectively; corresponding connections may be made with respect to the second and third stages through respective diodes of the diode banks 320' and 330'. Further, those four additional first-stage conductors 311 through 314 may be connected through respective diodes, in the diode bank 310, to conductor 315; corresponding connections may be made with respect to the second and third stages through respective diodes of the diode banks 320 and 330. A normally open switch (for example so biased) 451 may be interposed between conductor 400 and the conductor 401, a similar switch 452 may be interposed between that conductor 400 and the conductor 402, and so on.

Attention may now be directed to the operation of the interval-control means, with the typical interconnections illustrated in the cross-bar arrangement in FIG. 1. Let it be assumed that the conductor 400 is at a positive potential and that the switch 451 is briefly closed. This will apply positive potential to the conductor 401 and therefrom through diodes 411′, 421′ and 431′ to the conductors 411, 421 and 431. As a result of the illustrated interconnections of those conductors to certain of the horizontal conductors this will result in the application of positive potential (i) to the conductor 313, therefrom through the respective diode of the bank 310 to the conductor 315, and also therefrom through the respective diode of the bank 310′ to the conductor 318, (ii) to the conductor 326, and (iii) to the conductor 339. In turn there will be quickly charged capacitors 215 and 218 of the first stage, capacitor 226 of the second stage, and capacitor 239 of the third stage.

Let it further be assumed that coincidentally with the brief closure of switch 451 both the principal timing means 130–170 and the stepping means 50 are actuated. While the stepping means is effectively connecting its output terminal 51 and thus conductor 211 to the point O, the capacitors 215 and 218 of the first stage will discharge through the respective networks 215″ and 218″, rendering conductive the transistors in those two networks; the conductivity of the transistor in 215″ will cause the instant triggering of the first timer 130, and that of the transistor in 218″ will cause the timing duration of the second timer to be reduced by two pulse periods—with the net result that the interval determined by the principal timing means will be one of three pulse periods, during which the pulse generator will transmit three pulses. While the stepping means is effectively connecting its output terminal 52 and thus conductor 221 to the point O, the capacitor 226 of the second stage will discharge through the network 226″, rendering conductive the transistor in that network; that conductivity will cause the timing duration of the second timer to be reduced by four pulse periods—with the result that the interval determined by the principal timing means will be one of six pulse periods, during which the pulse generator will transmit six pulses. While the stepping means is effectively connecting its output terminal 53 and thus conductor 231 to the point O, the capacitor 239 of the third stage will discharge through the network 239″, rendering conductive the transistor in that network; that conductivity will cause the timing duration of the second timer to be reduced by one pulse period—with the result that the interval determined by the principal timing means will be one of nine pulse periods, during which the pulse generator will transmit nine pulses. As an overall result pulses appropriate to the dialing of the telephone address "369" will have been transmitted.

It may readily be discerned by analogy that if with the illustrated interconnections switch 452 (instead of 451) be closed, then capacitors 215 and 217 of the first stage, capacitor 227 of the second stage, and none of the third-stage capacitors, will be charged. During the effective connections (successively) of conductors 211 and 221 to the point O by the stepping means there will of course be successively transmitted a train of two and a train of eight pulses; during the subsequent effective connection of the conductor 231 the absence of any third-stage transistor conductivity will simply result in the interval determined by the principal timing means being one of its full ten pulse periods, during which the pulse generator will transmit ten pulses (appropriate to dialing of a "O"). As an overall result pulses appropriate to the dialing of the telephone address "270" will have been transmitted. Obviously, different interconnections of the vertical-bar conductors 412–422–432 with the horizontal conductors would have resulted in the dialing of a different telephone address upon closure of switch 452—and the same is of course true in the case of switch 451 and the vertical-bar conductors 411–421–431, and of any further vertical-bar conductors and switches which may be included.

Among the functions of the control unit 10 (above referred to but not yet described) and certain further elements associated therewith are the control of the potential of the conductor 400 from which the capacitors 215, 216 etc. are charged; the overall control of those capacitors' charges through the clamping diodes 215′, 216′ etc.; the actuation of the principal timing means and of the stepping means; the restoration of the apparatus, upon the completion of the dialing of a telephone address, to a quiescent state in which it is prepared for reuse.

In the control unit 10 a p-n-p transistor 20 may be interposed between the power-input conductor 13 (which has a potential about 0.7 volt less than that of the point P) and the power-output conductor 17 of the unit, with emitter to the former and collector to the latter; a high-value resistor 21 may be shunted from the transistor's base to its emitter. Also from that base to that emitter there may be connected in progressive serial relationship a resistor 22, a capacitor 23 and a resistor 24; to the junction between 22 and 23 there may be connected the anode of a diode 25 whose cathode is connected to the emitter of the transistor. From the collector of the transistor 20 to the power-input conductor 11 (which is connected to the point N) there may be connected in progressive serial relationship three resistors 26, 27 and 28, and a capacitor 29 across which may be connected a medium-valued resistor 31. To the junction between 28 and 29 there may be connected the base of an n-p-n transistor 30 whose emitter may be connected to the power-input conductor 12 (whose potential is about 0.7 volt positive with respect to the point O), and whose collector may be connected to the junction between 23 and 24. From the base of the transistor 20 to the power-input conductor 12 there may be connected in progressive serial relationship a resistor 34 and the collector-emitter path of an n-p-n transistor 35; a capacitor 33 may be connected from the collector of that transistor to the conductor 11. From the junction of 27 and 28 to the base of the transistor 35 there may be connected a resistor 36, and from that base to the conductor 11 there may be connected a capacitor 37. From the power-input conductor 14 (which is connected to the point P) to the collector of transistor 35 there may be connected in progressive serial relationship a resistor 19 and a diode 32.

The clamp-out conductor 15 abovementioned may be connected to the base of the transistor 35. The conductor 16 (to which the clamping diodes 215′, 216′ etc. are connected) may be connected to the junction between resistors 26 and 27. The power-output conductor 18 may be connected to the junction between resistor 19 and diode 32—that conductor 18 also being connected to the conductor 400 through a diode 399.

From the clamp-out conductor 15 to the point O there may be connected the collector-emitter path of an n-p-n transistor 550 (to be seen in FIG. 1 below the right-hand portion of the control unit 10), whose base-emitter path may be shunted by a high-valued resistor 549. By means of a resistor 551 and a series of several (for example, four) diodes 552 serially connected from the stepping-means control terminal 56 to the base of the transistor 550 that transistor may be maintained conductive whenever the stepping means is inoperative (and the terminal 56 therefore at a substantial positive potential) and otherwise non-conductive (i.e. when the stepping means is operative and the terminal 56 therefore at low potential). With the apparatus in quiescent condition the conductivity of transistor 550 maintains the base of transistor 35 at a potential less than that of the transistor 35 emitter and the transistor 35 therefore non-conductive; transistors 20 and 30 will also be non-conductive, and the control conductor 16 will be at the potential of point N by reason of its connection thereto through the resistors 27, 28 and 31.

Upon the closure of either the switch 451 or the switch 452 (or any other corresponding switch) and the resulting flow of current to one or more of the fifteen capacitors 215, 216 etc. that current will at first flow through the associated clamping diode or diodes (of the fifteen designated as 215′, 216′ etc.), the conductor 16, the resistors 27 and 28 and the base-emitter path of transistor 30, rendering that transistor conductive. That conductivity will result in the abrupt lowering of the potential of the lefthand plate of capacitor 23 (both plates of which were theretofore at the potential of conductor 13) and in the flow of charging current into the righthand plate so that capacitor through the emitter-base path of transistor 20 and through the resistor 22, which will persist for an interval of the order of 20 milliseconds or more (the time constant of 22–23 being chosen to that end), and by that flow of charging current the transistor 20 will be rendered conductive, albeit temporarily. The transistor 20 conductivity has several effects.

First it will raise the potential of the control conductor 16 to a positive potential, which may be a major fraction of that of the point P, so that the upper plates of the fifteen capacitors 215, 216 etc, will no longer be clamped to point N (as they quiescently were) but will instead be able to accept the above-described chargings through the energized ones of the associated fifteen conductors 315, 316 etc. Secondly, it will raise the potential of the power-output conductor 17 to almost the potential of the point P, with the results (a) that the principal timing means 130–170 will be actuated through diode 39 and transistor 40, (b) that the stepping means 50 will be actuated through the capacitor 55 and (c) that as a result of the stepping-means actuation the transistor 550 will be rendered non-conductive and the clamping-out action which it quiescently exerted on transistor 35 will be removed. Thirdly, it will start the charging of capacitor 37 through resistor 36 from a several-volt source (the junction of 27 and 28), so that the transistor 35 will be rendered conductive after an interval for example of the order of 10 milliseconds.

The conductivity of transistor 35, invoked at a typical interval of 10 milliseconds after closure of the switch 451 or 452, in turn has two effects. First, it will result in a sustained flow of a modest current from the base of transistor 20 through the resistor 34; this flow, beginning before the charging of capacitor 23 has been completed, maintains the transistor 20 conrductive without further reliance on the charging of 23 (transistors 20 and 35, once 35 becomes conductive, being in effective SCS or latching relationship). Secondly, through the diode 32 it will clamp the power-output conductor 18 down to a potential only a volt or so above that of the point O, so that the conductor 400 will be thereafter incapacitated as a source of significant charging current for any of those of the fifteen capacitors 215, 216 etc. which have not already been charged. This incapacitation is a valuable function, especially when the switches 451, 452 etc. are actuated by respective closely-spaced buttons—for the unintented depression of a second button as an incident to the intended depression of a first, so long as there be more than 10 milliseconds time space between the actual switch closures, is thereby precluded from upsetting the proper operation of the apparatus.

It may be mentioned with respect to the control unit 10 that the illustrated arrangement in which current through the control conductor 16 is relied on for the triggering into conduction of the unit's transistors has proven of great value in minimizing the susceptibility to spurious such triggering by transients which often are present on the telephone line to which the apparatus is connected through the load L, and which have proven disastrous with certain other arrangements for the intended triggering of the unit's transistors. It may also be mentioned that the presence of the diodes 6 and 32 (the latter in association with the capacitor 33, which may for example be of the order of .33 mfd., and the former in association with the capacitor 8, which may include a paper capacitance of the same order of magnitude) have also proven of material help in reducing such susceptibility.

The time constant of the resistor 19, taken in conjunction with a small number (considered in parallel) of the fifteen capacitors 215, 216 etc. may typically be chosen so that such capacitors may charge through that resistor to the elevated potential of conductor 16 in a very small fraction of a second. The time constant of the capacitor 219 (or of any of the other fourteen corresponding capacitors) taken in conjunction with the resistor **219*b*** (or any of the other fourteen corresponding resistors) may be a few times the pulse period of the pulse generator.

The description of the control unit 10 and its functions thus presented rounds out a description of the manner of invoking an operation, and of that operation itself, of the apparatus to dial selectively one of a plurality of telephone addresses for which appropriate interconnections have previously been made in the cross-bar arrangement—or in other words for which the apparatus has been preadjusted. As already noted, at the conclusion of such an operation there will be an advancement of the stepping means 50 to inoperative condition, and the resulting rise of potential of its control terminal 56 and the resulting sustained squelching of the pulse generator through 108–107–106 have also already been noted. It is also significant to note that there will also occur a rendering conductive of the transistor 550 to result in the rendering non-conductive (or clamping-out) of the transistor 35, which in turn will result in rendering transistors 20 and 30 non-conductive. The rendering non-conductive of the transistor 20 will result in the removal of positive potential from the power-output conductor 17 (precluding another operation of the principal timing means 130–170); it also results in the immediate dropping of the potential of the control conductor 16, so that the fifteen clamping diodes 215′, 216′ etc. will forthwith discharge the capacitors 215, 216 etc. of any charges then remaining in them. The rendering non-conductive of the transistor 30 will result in the discharge of capacitor 23 through diode 25 and resistor 24, preparing that capacitor for its intended action in a repeated use of the apparatus.

It is contemplated that in the normal use of the apparatus the switch such as 451 or 452 which invoked its operation will have been released (i.e. opened) before that operation has been concluded; there is, however, no assurance that this will be the case—and if in fact that switch were then still being held closed, then in the absence of suitable safeguards the starting cycle of the control unit 10 would promptly be reinitiated—with unintended consequences, at least with respect to the principal timing means, if not also with respect to other elements. It is significant to nnote that suitable safeguards against this undesirable eventuality are inherently provided by the capacitor 23, which cannot again perform its operation-starting function until substantially discharged, which in turn cannot occur so long as transistor 30 is maintained conductive (as it would be, through conductor 16 and resistors 27 and 28) by the continued closure of the operation-invoking switch. Thus the operation of the switch (such as 451 or 452) to which the apparatus is responsive is limited to a throw of that switch from its unoperated (or open) condition to its operated (or closed) condition.

It has been found that occasionally severe transients on the telephone line such as above referred to may result in the spurious triggering of some stage of the stepping means 50; this, unaccompanied by any operation of the timing means and therefore by any rendering conductive of the transistor 190 and any advancement of the stepping means, will leave the stepping means in a sustained spurious non-advancing state of operation—which among other things would keep lowered the potential of the stepping-means control terminal 56 and would keep desquelched the pulse generator 100, which would accordingly operate indefinitely. Means may be provided which in this event will temporarily declamp and render conductive the transistor 35, thereby rendering conductive the transistor 20 and placing the control unit 10 in operation so that the timing means 130–170 and 180 will proceed to operate through normal intervals and progressively advance the stepping means to inoperative condition—whereupon the terminal 56 will be restored to substantial potential, the pulse generator will be sustainedly re-squelched and the temporary declamping of transistor 35 ended.

Such means may comprise two potentiometers, one consisting of an upper resistor 558 and a lower resistor 559 shunted from the point P to the point O, and the other consisting of a diode 562, an upper resistor 563 and a lower resistor 564 shunted from the terminal 56 to the point O. The emitter-base circuit of a p-n-p transistor 560 together with a diode 561 in series with the transistor base may be connected from the junction between 558 and 559 to the junction between 563 and 564. The collector of the transistor may be connected through a diode 565 and a high-valued resistor 566 to the base of the transistor 35. The relative values of the potentiometer resistors are so arranged that so long as the stepping means is out of operation and the potential of the terminal 56 is therefore substantial the transistor 560 will be non-conductive, but that when the stepping means goes into operation and the potential of the terminal 56 is therefore lowered that transistor will be rendered conductive and, with a substantially more-than-10-millisecond delay (due to the resistor 566 and the capacitor 37) will apply positive voltage to the base of and will thereby render conductive the transistor 35. If that transistor has already been rendered conducive in an intended operation of the apparatus, the effect of the transistor 560 will be harmless surplusage; in the case of the spurious triggering mentioned in the preceding paragraph, however, the effect will be the temporary declamping abovementioned.

FIG. 1 shows a resistor 571 and a capacitor 572 serially connected between the base of the transistor 190 and the point P. These are of no significance when the apparatus stands connected (by its terminals 1 and 2) to a power source; they are, however, desirable in order to obviate unwanted effects which might otherwise be incident to the act of connecting it to the source in the first place.

Figure 1A:
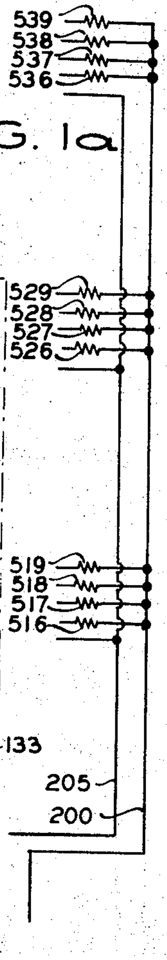

FIG. 1 has illustrated the use of a single resistor 506 in series with the work terminals of each of the networks 216'', 226'' and 236'', a single resistor 507 in series with the work terminals of each of the networks 217'', 227'' and 237'', etc. This is an entirely workable arrangement if the transistors in the networks be of top quality and of uniform characteristics. If it be desired to relax those requirements somewhat, the common resistors 506, 507, 508 and 509 may be eliminated and separate resistors used in series with those work terminals individually. This is illustrated by the resistors 516 through 519, 526 through 529 and 536 through 539 in the fractional FIG. 1*a* (intended for optional substitution for the upper righthand portion of FIG. 1).

Figure 2:
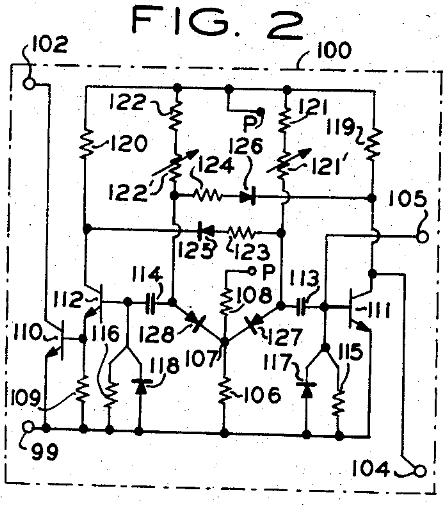
FIG. 2 is a schematic diagram of a pulse generator suitable for use in the embodiment of FIG. 1.

A typical form of the pulse generator 100 is illustrated in FIG. 2. It may for example comprise two n-p-n transistors 111 and 112, the emitter of 111 being connected directly and that of 112 being connected through a resistor 109 to the terminal 99 (which is externally connected to the point O); the collectors of 111 and 112 may be connected to the point P through respective resistors 119 and 120. The bases of transistors 111 and 112 may be connected to the terminal 99 through respective resistors 115 and 116, which may be shunted by respective diodes 117 and 118 each poled to conduct current toward the respective transistor base; those bases may also be connected to a point 107 of intermediate potential through respective circuits 113–127 and 114–128 each serially comprising a capacitor and a diode poled to conduct current toward that point 107. The junction between 113 and 127 may be connected to the point P through the serial combination of a high-valued fixed resistor 121 and a lower-valued variable resistor 121', and that junction may also be connected to the collector of transistor 112 through a circuit serially comprising a resistor 123 and a diode 125 poled to conduct current toward that collector; the junction between 114 and 128 may be connected to the point P through the serial combination of a high-valued fixed resistor 122 and a lower-valued variable resistor 122', and that junction may also be connected to the collector of the transistor 111 through a circuit serially comprising resistor 124 and a diode 126 poled to conduct current toward that collector. The intermediate-potential point 107 may be the junction of two resistors 108 and 106 which, in series with each other, are connected between the point P and the terminal 99.

The synch terminal 104 of the pulse generator may be connected to the collector of transistor 111, so that it will be essentially at the potential of terminal 99 (i.e. that of the point O) when the transistor 111 is conductive but will rise to a substantial potential when that transistor becomes non-conductive. The squelch terminal 105 may be connected to the base of the transistor 111, the positive potential quiescently applied (as above described) to that terminal by external means serving to maintain that transistor quiescently conductive. Across the resistor 109 there may be connected the base-emitter path of an n-p-n transistor 110, which is thereby placed in series with the base-emitter path of transistor 112 so that transistor 110 will be conductive whenever transistor 112 is conductive; the collector of transistor 110 may be connected to the output terminal 102 of the pulse generator.

The principle of operation of such a pulse generator is known (having for example been described in the copending application of Walter Pecota, Ser. No. 414,496, filed Nov. 18, 1964) and need not be detailedly described. In general, the transistors 111 and 112 will be alternately conductive; the pulse period — or length of a whole cycle of such alternation, which may for example be about 100 milliseconds — is established by the values of capacitors 113 and 114 and of resistors 121–121' and 122–122'. Upon the de-squelching of the pulse generator (by removal of positive potential from the terminal 105) the transistor 111 will forthwith become non-conductive and the transistor 112 conductive (it being during the period of the transistor 112 conductivity that the pulse is transmitted); upon the expiration of a fraction of the pulse period the transistor 112 will become non-conductive and the transistor 111 again conductive; upon the expiration of the entirety of the pulse period the transistor 111 will again become non-conductive and the transistor 112 again conductive—and so on. The ratio of the fraction of the pulse period during which the transistor will be conductive may be controlled by adjustment of the variable resistors 121' and 122' (e.g. by the increase of one and the decrease of the other, for which purpose they may if desired be suitably interlinked).

A typical basic design to which each of the timers 130 and 170 (and the timer 180, if desired) may conform is illustrated in FIG. 3. There will first be described the elements to the right of the dash-dot line Z—Z in that figure, since those elements constitute the timer proper. Therein the reference conductor appears as 137 and the input conductor as 138. From 138 to 137 there may be connected in parallel with each other two series circuits, one comprising resistors 139, 140 and 141 and the other comprising a timing capacitor 142 and a timing resistor 143; the junction between 140 and 141 is designated as point K, and that between 142 and 143 as point J. From the point J to the junction between resistors 139 and 140 there may be connected a diode 144 poled to conduct current toward that junction. From the point K to the point J there may be serially connected the base-emitter path of an n-p-n transistor 145 (hereinafter referred to as the sensing transistor) and a diode 146 poled to conduct current toward the point J.

The emitter of a p-n-p transistor 150 (hereinafter referred to as the switching transistor) may be connected to the input conductor 138, and the collector of that transistor to the output terminal 132; a high-valued resistor 149 may be shunted across the emitter-base path of that transistor, and the base of that transistor may be connected through a resistor 147 to the collector of transistor 145. From the ouput terminal 132 to the point J there may be connected a diode 151 poled to conduct current toward J.

From the output terminal 132 to the reference conductor 137 there may be connected a series circuit comprising a resistor 153 and the base-emitter path of an n-p-n transistor 155 (hereinafter referred to as the regenerating transistor), that base-emitter path being shunted by a high-valued resistor 154. The emitter of the sensing transistor 145 may be connected to the collector of the regenerating transistor 155 through a resistor 156 and a diode 157.

When no positive potential is applied to the input conductor 138 each of the three transistors 145, 150 and 155 will be non-conductive. When positive potential is applied to that conductor the timing capacitor will forthwith become charged (lower plate negative) to the small voltage which appears across the resistor 139, and there will begin a further charge of that capacitor through the timing resistor 143.

At the expiration of the timing duration of the timer (established by the values of the timing capacitor 142 and the timing resistor 143) the potential of the point J will have been brought down to the potential of the point K (which may for example be about midway between the potentials of the conductors 138 and 137), and base-emitter current—at first small—will start to flow in the sensing transistor 145 and through the diode 146. This will result in the flow of a much greater current through the collector-emitter path of that transistor and thus through the resistor 147 and through the emitter-base path of the switching transistor 150, rendering the switching transistor conducive to at least an appreciable degree. This in turn will result in the flow of current through the resistor 153 and the base-emitter path of the regenerating transistor 155; still in turn this will result in the flow of a much greater current through the diode 157, the resistor 156 and the base-emitter path of the sensing transistor 145—which in that base-emitter path will augment the small current which initially flowed therein, thereby providing a regenerative effect which renders abrupt and positive the actions described in this paragraph, and which essentially forthwith renders the switching transistor 150 fully conductive. That conductivity is maintained (so long as positive potential continues to be applied to the input conductor 138) by the continued conducivity of the sensing transistor 145—that being itself maintained by the continued conductivity of the regenerating transistor 155. The establishment of conductivities described in this paragraph constitutes the triggering of the timer.

It may be noted that forthwith upon that triggering the timing capacitor 142 will be discharged through the emitter-collector path of the switching transistor and the diode 151. This of course will forthwith terminate the flow of current through the diode 146—but without effect on the sensing transistor, whose conductivity has already been seen to be then maintained by the regenerating transistor. Upon the removal of positive potential from the input conductor 138 the timer will be forthwith restored to its initially described condiion of non-conductivity of each of its three transistors and thereby prepared for essentially instant reuse.

The instant-trigger terminal 135 (the application to which of a substantial positive potential is to trigger the timer forthwith) may simply be connected to the base of the regenerating transisistor 155—for the rendering conductive of that transistor will automatically bring the sensing transistor 145 and in turn the switching transistor 150 into conduction. (Note is made that if no instant-trigger terminal is to be provided, then the diode 157 may be omitted.)

The time-variation terminal 136 may simply be connected to the joint J. The effective connection of an external resistor—such as 506, 507, 508 or 509 abovementioned—between that terminal and the point O (to which the reference conductor 137 is connected, for example through diode 161 hereinafter referred to) will of course place that external resistor in effectively parallel relationship to the timing resistor 143 to reduce the timing duration of the timer.

To further the immunity of the timer to transients such as above referred to in other connections it is often helpful to provide small reverse biases on the transistors 150 and 155. To do this in the case of the former transistor a diode 158 may be interposed between the input terminal 131 and the input conductor 138, and a resistor 159 (preferably shunted by a small capacitor 160) may be connected from that input terminal to the base of the switching transistor 150 via conductor 148 (which would not be present if no bias is to be provided for 150). To do this in the case of the latter transistor a diode 161 may be interposed between the reference conductor 137 and the reference terminal 129, and a resistor 162 (preferably shunted by a small capacitor 163) may be connected from that reference terminal to the base of the regenerating transistor 155 vias conductor 168 (which would not be present if no bias is to be provided for 155). In each instance the bias developed on the transistor base will be a fraction of the drop across the respective diode.

To provide for the synchronization of the triggering of the timer with the beginning of a pulse from the pulse generator there may be included in the timer a p-n-p transistor 165 whose collector is connected to the point K through a diode 166 and a resistor 167 and whose emitter is connected to the input terminal 131; the base of that transistor may be connected to the synch terminal 34 through a resistor 164. When the synch terminal 134 is connected to a point of low potential the transistor 165 will be rendered conductive to effectively shunt the resistor 167 across the resistors 139 and 140 and thereby to elevate the potential of the point K. If this be done momentarily when the timer is closed to (e.g. within one pulse period of) triggering it will induce that triggering forthwith.

Figure 4:
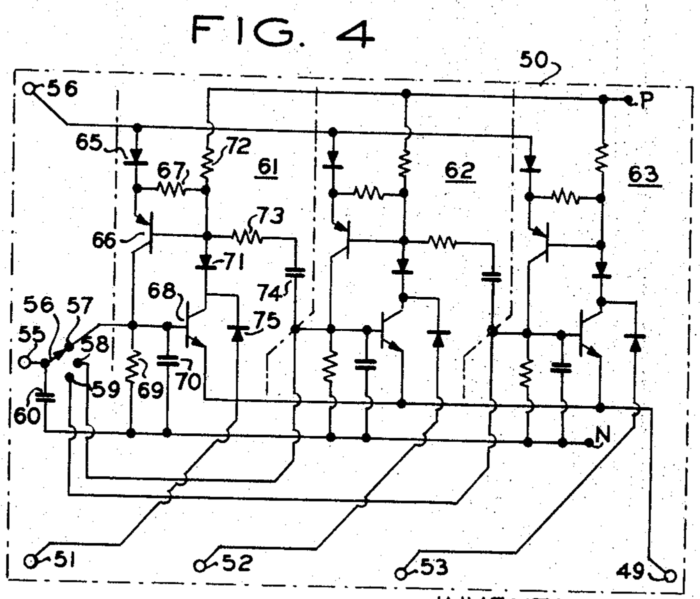
FIG. 4 is a schematic diagram of a stepping means suitable for use in the embodiment of FIG. 1.

A typical form of the stepping means 50 is shown in FIG. 4. It may comprise a number of stages equal to the number of digits to be dialed by the apparatus (in the illustrated embodiment of FIG. 1, three); those stages are respectively identified in FIG. 4 as 61, 62 and 63, of which the first will now be described. It may comprise a p-n-p transistor 66 and an n-p-n transistor 68 in effective SCS relationship—the emitter collector path of 66 being in series relationship with the base-emitter path of 68, and the emitter-base path of 66 being in series relationship with the collector-emitter path of 68 (preferable with a diode 71 interposed therebetween). The control terminal 56 of the stepping means may be connected to the emitter of 66 through a diode 65; the base of 66 may be connected through a resistor 72 to the point P and through a high-valued resistor 67 to the emitter of that transistor. The emitter of 68 may be connected to the reference terminal 49 (which will be externally connected to the point O); the base of 68 may be connected to the point N through a high-valued resistor 69, preferably shunted by a small capacitor 70. The output terminal (51, 52 or 53) for each stage may be connected to the collector of the n-p-n transistor of that stage through a diode (e.g. 75). Coupling from each stage (except the last stage 63) to its successor may be provided by a resistor (e.g. 73) and a capacitor (e.g. 74) serially connected from the base of the p-n-p transistor of that stage (e.g. the base of 66) to the base of the n-p-n transistor of the succeeding stage. The start terminal 55 of the stepping means may normally be connected to the base of the first-stage n-p-n transistor 68.

Quiescently none of the transistors of the stepping means will be conductive, and each of the coupling capacitors (such as 74) will be charged. When a positive potential is momentarily applied to the start terminal 55 the base of the transistor 68 will be driven momentarily positive with respect to its emitter, triggering the first-stage pair of transistors into conduction, effectively connecting the first-stake output terminal 51 to the point O via diode 75 and the collector-emitter path of transistor 68, and discharging the coupling capacitor 74 through the resistor 73, diode 71, the collector-emitter path of 68, the external circuit (i.e. diode 3 of FIG. 1) present between the points O and N, and the resistor in the second stage analogous to 69 of the first stage.

When the positive potential normally applied to the control terminal 56 is momentarily eliminated (by momentary effective connection of that terminal to the point O by external means already described) the pair of previously-conductive transistors 66–68 will be rendered non-conductive and they will so remain. As the potential of the terminal 56 resumes, however, the charging of the previously-discharged capacitor 74 will cause the flow of base-emitter current in the n-p-n transistor of the second stage, triggering the second-stage pair of transistors into conduction and performing as to the second stage the same functions as were performed as to the first stage when the transistors 66–68 were triggered into conduction. When the positive potential is again momentarily eleminated from terminal 56 similar actions will again take place, but each with respect to a stage advanced by one, so that the third-stage transistors will then be triggered into conduction. When that positive potential is still again momentarily eliminated the stepping means will be restored to its quiescent condition.

There may be occasions when apparatus designed for the dialing of a certain number of digits (e.g. three) is desired to be devoted to use in the dialing of telephone addresses of a lesser number only. To provide for such cases the connection of the start terminal 55 to the base of the first-stage transistor 68 is shown as made through the blade 56 and contact 57 of a switch which is provided with other contacts 58 and 59 respectively connected to the bases of the n-p-n transistors of succeeding stages. By movement of the blade 56 to one of those other contacts any desired number of the earlier stages of the stepping means may be effectively removed from operation. It is desirable in such an arrangement to connect a small capacitor 60 from the start terminal 55 to a low-potential point such as N—this, as well as the capacitors such as 70 in the individual stages, being desirable to minimize unintended interstage couplings and possible sensitivity to transients. Sensitivity to transients is also minimized by the small reverse biasing of the bases of the n-p-n transistors resulting from the connection of the resistors such as 69 to the point N rather than the point O.

While I have illustrated and described my invention in terms of specific embodiments thereof, it will be understood that I intend thereby no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. In telephone dialing apparatus, the combination of a plurality of groups each of a plurality of capacitors; circuit means connected with said capacitors and normally effective to maintain each of them in a normal state in respect of charge; a conductor to which the connection of any of said capacitors will change the state of charge of that capacitor; switching means interposed between said capacitors and said conductor and operable to connect at least one selected capacitor in each group to said conductor, thereby to change the states of charge of said selected capacitors; stepping means actuable to establish, with respect to said selected capacitors in a predetermined group-to-group succession, current flows tending to restore their normal states of charge; and means controlled by said current flows for transmitting dialing signals determined by the capacitor selection in each of said groups.

2. In telephone dialing apparatus, the combination of a plurality of groups each of a plurality of capacitors; a pair of conductors to a first of which a first terminal of each of the capacitors is operatively connected; means for maintaining the second of the conductors at a potential substantially different from that of the first; switching means interposed between the capacitors and the second conductor and operable to effect the charging of at least one selected capacitor in each group; stepping means actuable to effect current flows from the charged capacitors in a predetermined group-to-group succession; and means controlled by said current flows for transmitting dialing signals determined by the capacitor selection in each of said groups.

3. The subject matter claimed in claim 2 further including means responsive to an operation of said switching means for actuating said stepping means.

4. The subject matter claimed in claim 2 further including means for preventing an operation of said switching means continued after the operation of said stepping means is completed from recharging the selected capacitors.

5. The subject matter claimed in claim 2 further including means effective after the charging of the selected capacitors for removing said potential from the said conductor.

6. The subject matter claimed in claim 2 further including a plurality of means respectively connected with the capacitors for discharging them, and means responsive to operation of said switching means for rendering said discharging means ineffective.

7. The subject matter claimed in claim 6 further including means responsive to the completion of operation of said stepping means for rendering said discharging means again effective.

8. The subject matter claimed in claim 2 further including means responsive to and rendered effective closely after operation of said switching means for rendering said conductor-maintaining means ineffective.

9. The subject matter claimed in claim 8 further including means responsive to the completion of operation of said stepping means for rendering said conductor-maintaining means again effective.

10. In telephone dialing apparatus, the combination of a capacitor; circuit means connected with said capacitor and normally effective to maintain it in a normal state in respect of charge; means for effecting a temporary flow of current for the charging of the state of charge of said capacitor means controlled by said capacitor while its state of charge remains changed for transmitting dialing signals; and latching means, actuable by the initial flow of said current, for rendering and maintaining said circuit means ineffective, whereby the state of charge of said capacitor may be changed by the further flow of said current without resumption of said normal state as an incident to the cessation of said flow.

11. The subject matter claimed in claim 10 wherein said circuit means is a clamping means and said normal state is a substantially discharged state.

References Cited

UNITED STATES PATENTS 3,417,207 12/1968 Pecota ______________ 179—90

OTHER REFERENCES

"Capacitor Discharger" (May 1965) in Electronic Circuit Design Handbook, 1st Ed. (third printing December 1966) Mactier Publishing Corp., New York City.

KATHLEEN H. CLAFFY, Primary Examiner

T. J. D'AMICO, Assistant Examiner

U.S. Cl. X.R.

320—1